United States Patent

[11] 3,597,997

[72] Inventor Ronald L. Phillips
 Orchard Lake, Mich.
[21] Appl. No. 23,573
[22] Filed Mar. 30, 1970
[45] Patented Aug. 10, 1971
[73] Assignee General Motors Corporation
 Detroit, Mich.

[54] HYDROMECHANICAL TRANSMISSION
 6 Claims, 1 Drawing Fig.
[52] U.S. Cl. .................................................. 74/687
[51] Int. Cl. ............................................. F16h 47/04
[50] Field of Search ......................................... 74/687,
 720.5

[56] References Cited
 UNITED STATES PATENTS
 3,383,952 5/1968 Christenson ................. 74/720.5
 3,433,095 3/1969 Tuck .......................... 74/687
 3,470,769 10/1969 Livezeg ....................... 74/687 X Primary Examiner—Arthur T. McKeon
Attorneys—W. E. Finken, A. M. Heiter and R. L. Phillips ABSTRACT: A hydromechanical transmission having a variable-ratio hydrostatic drive unit, two planetary gearsets and a plurality of drive-establishing devices including a one-way brake and a one-way clutch combined to provide three forward speed range drives and a reverse speed range drive with each such drive established by engagement of only one drive-establishing device and with the one-way devices permitting the lower speed range drive-establishing devices to remain operational in higher forward speed ranges.

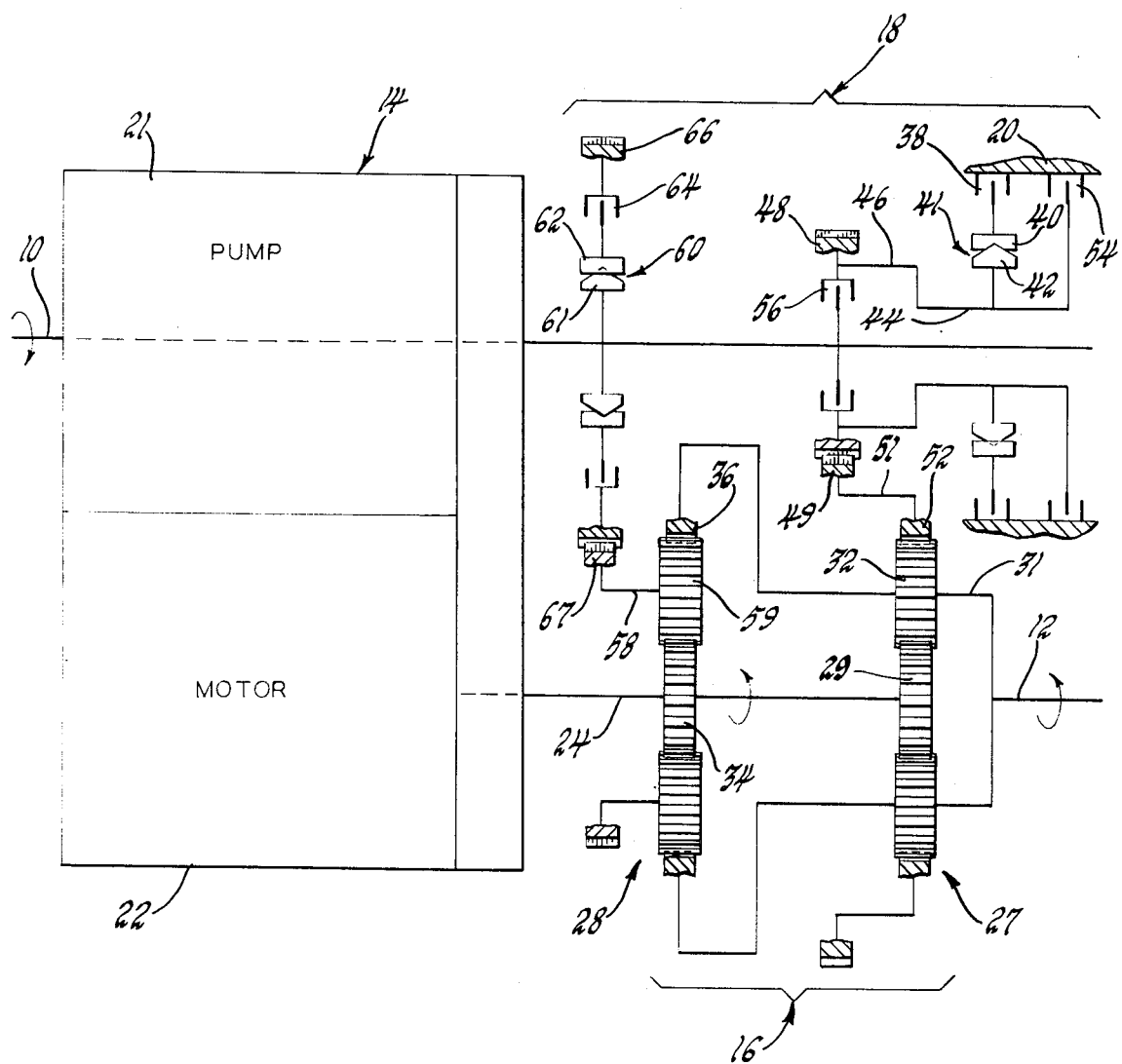

HYDROMECHANICAL TRANSMISSION

This invention relates to hydromechanical transmissions and more particularly to vehicular hydrostatic-mechanical transmissions providing a plurality of speed range drives.

In vehicular transmissions, a variable-ratio hydrostatic drive unit offers the advantages of controlled, infinitely variable speed and torque ratios within limited ranges. It is also well known that these ranges can be extended by combining gearing generally of the planetary type with the hydrostatic drive unit and that further advantages can be obtained by employing a split power path, one path being hydraulic and the other being mechanical with increased efficiency resulting from the use of the mechanical power path. In such hydromechanical transmissions providing more than one drive range, it is known that a shift between drives can be accomplished by a friction drive-establishing device that is speed synchronized for engagement at a predetermined transmission input-output speed ratio. In such hydromechanical transmission arrangements, a shift may occur by engaging one drive-establishing device while releasing another drive-establishing device. Thus, the controls for controlling the shift of such hydromechanical drive train arrangements perform two control operations to effect such shifting.

The hydromechanical transmission according to the present invention combines a hydrostatic drive unit, two planetary gearsets and a plurality of drive-establishing devices to provide a plurality of forward speed range drives and a reverse drive. The forward drives include a low speed full hydrostatic drive and higher speed hydromechanical drives. Each of the forward speed range drives are established by engagement of a single friction drive-establishing device which is speed synchronized at a predetermined transmission input-output speed ratio while any friction drive-establishing device that was previously engaged to provide a lower speed range drive is permitted to remain engaged by operation of a one-way device.

An object of the present invention is to provide a new and improved hydromechanical transmission.

Another object is to provide a hydromechanical transmission having a variable-ratio hydrostatic drive unit, two planetary gearsets and a plurality of drive-establishing devices including one-way devices combined to provide a plurality of forward speed range drives with each such drive established on engagement of a single friction drive-establishing device while previously engaged friction drive-establishing devices remain engaged on an upshift.

Another object is to provide a hydromechanical transmission having a variable-ratio hydrostatic drive unit, two planetary gearsets and a plurality of drive-establishing devices including one-way devices that are combined to provide a full hydrostatic low speed range drive and a plurality of higher speed range hydromechanical drives with each such drive established on engagement of a single friction drive-establishing device and with previously engaged friction drive-establishing devices being permitted to remain operational on upshifting through the drives.

These and other objects will be more apparent from the following description and drawing which diagrammatically shows an embodiment of the hydromechanical transmission according to the present invention.

Referring to the drawing, there is shown a hydromechanical transmission generally comprising a transmission input shaft 10 that is selectively drivingly connected to a transmission output shaft 12 by a variable-ratio hydrostatic drive unit 14, planetary gearing 16 and a drive-establishing portion 18. All of the components are suitably supported in a transmission housing generally designated at 20 with the input shaft 10 adapted for connection to an engine and the output shaft 12 adapted for connection by a final drive train to the vehicle's driving wheels. The input shaft 10 and output shaft 12 have parallel axes and the transmission components are closely arranged relative to these shafts as described in more detail later to provide a compact arrangement characterized by the short length.

Input power to the transmission is transmitted by the input shaft 10 which is connected to drive the pump 21 of hydrostatic drive unit 14. Motor 22 which is hydraulically driven by pump 21 is connected to drive a motor output shaft 24 that is axially aligned with output shaft 12. The hydrostatic drive unit 14 may be of a conventional type with the pump 21 having variable displacement or both the pump 21 and motor 22 having variable displacement. Thus, with power to pump 21 and on controlling displacement, the motor 22 can be caused to drive the motor output shaft 24 from zero speed in a hydraulically locked condition to some maximum speed in either direction.

The planetary gearing 16 has only two planetary gearsets 27 and 28, each of these gearsets being of the simple type in that they each have a sun gear member, a ring gear member and a carrier member having pinions meshing with the sun gear and ring gear. In gear set 27, the sun gear 29 is connected to motor output shaft 24 and carrier 31 carrying pinions 32 is connected to transmission output shaft 12. In gear set 28, the sun gear 34 is connected to motor output shaft 24 and the ring gear 36 is connected to carrier 31 of the other gearset and is thus connected to output shaft 12.

The drive establishing portion 18 of the transmission arrangement established the transmission's different drives. The drive-establishing portion 18 comprises a low brake 38 which is of the friction disc type. Low brake 38 is grounded to the transmission housing 20 and on engagement brakes outer race 40 of a one-way brake 41. The inner race 42 of one-way brake 41 is connected to a sleeve shaft 44 which is connected to a drum 46. Drum 46 is connected to a spur gear 48 that meshes with a spur gear 49. Gear 49 is connected by a drum 51 to a ring gear 52 of gearset 27. Thus, when low brake 38 is engaged, the one-way brake 41 operates to prevent rotation of this ring gear 52 in one direction while permitting free rotation of this ring gear in the opposite direction. The ring gear 52 may also be selectively prevented from rotating in either direction by engagement of a reverse and low coast brake 54 which is of the friction disc type. Brake 54 is grounded to the transmission housing 20 and is operatively connected to ring gear 52 through sleeve shaft 44 and gears 48 and 49. The ring gear 52 may also be selectively drive by input shaft 10 by engagement of a high clutch 56 whose engagement connects input shaft 10 to gear 48, this mechanical input drive then being delivered by gear 49 to ring gear 52.

The drive-establishing portion further includes means for providing a one-way drive connection between the input shaft 10 and the carrier 58 of gearset 28, the carrier 58 carrying the pinions 59 of this gearset. This one-way drive is provided by a one-way clutch 60 whose inner race 61 is connected to input shaft 10 and whose outer race 62 is connected by engagement of an intermediate clutch 64 of the friction disc type to a spur gear 66. Gear 66 meshes with a spur gear 67 that is connected to carrier 58.

In the drive-establishing portion 18, the gears 48 and 66, friction clutches 56 and 64, friction brakes 38 and 54, the one-way brake 41 and the one-way clutch 60 are all concentric with the input shaft which extends through the pump for connection to the one-way clutch 60 and high clutch 56. The pump 21 and motor 22 are concentric with the input shaft 10 and output shaft 12, respectively. The planetary gearsets 27 and 28 are both concentric with the output shaft 12 and this arrangement together with that of the hydrostatic drive unit 14 and the drive-establishing portion 18 provides an overall short transmission length.

The one-way devices comprising the one-way brake and one-way clutch may be of either the sprag or roller type. The friction drive establishing devices comprising the friction brakes and clutches together with the hydrostatic drive unit may be operated in any known way, e.g. electrically, hydraulically, pneumatically or by some mechanical provision and according to a certain schedule.

The hydromechanical transmission described above may be operated to provide three forward speed range drives and a reverse speed range drive wherein the speed ratio between transmission input and transmission output in each drive is made infinitely variable by the variable speed ratio drive of the hydrostatic drive unit 14.

Neutral is provided by disengaging or releasing all of the friction drive-establishing device and conditioning the hydrostatic drive unit 14 so that the motor output shaft 24 is at zero speed while the input shaft 10 is rotating in the direction indicated by the arrow in the drawing. For ease in understanding, it will be assumed throughout the description of operation that input speed remains constant.

The first and lowest forward speed range drive is established by engaging only low brake 38 so that the one-way brake 41 is then effective to hold gear 48 against rotation in the direction opposite that of input shaft 10. With low brake 38 engaged, the hydrostatic drive unit 14 is then conditioned to drive the motor output shaft 24 and thus sun gear 29 in the direction indicated by the arrow in the drawing which direction will be called the forward direction since that is the direction that output shaft 12 rotates to produce forward vehicle motion, the forward direction of the output shaft also being indicated by an arrow in the drawing. With sun gear 29 thus driven in the forward direction, the ring gear 52 provides reaction by being prevented from rotating in the reverse direction by the operation of one-way brake 41 with the result that the carrier 31 and connected transmission output shaft 12 are driven in the forward direction at a reduced speed by the full hydrostatic drive thus provided. In this low speed range forward drive the ring gear 52 is thus permitted to run free in the forward direction during vehicle coasting. For engine braking in the forward low speed range drive, the reverse and low coast brake 54 may be engaged to prevent forward rotation of ring gear 52 so that drive can be in the reverse direction from output shaft 12 back to the hydrostatic drive unit 14.

In the forward low speed range drive, sun gear 34 is being driven in the forward direction by motor 22 while ring gear 36 of this gear set is being driven in the same direction by the carrier output from gearset 27. Sun gear 34 and ring gear 36 cooperate to provide drive in the same direction to carrier 58 with their forward speed components being additive in this drive. The carrier 58 in turn drives the driven member of intermediate clutch 64 through the gear train comprising gears 66 and 67. Since there is reversal of drive direction in this gear train, the driven member of clutch 64 is driven in the same direction as input shaft 10. The one-way clutch 60 provides for drive from input shaft 10 to the drive member of intermediate clutch 64 when the input shaft 10 is rotating in the direction indicated by the arrow and permits the driven member of clutch 64 to rotate relative to the input shaft in this direction. Thus, both the drive and driven members of intermediate clutch 64 are rotating in the same direction. The operating gears are selected so that at a predetermined transmission input-output speed ratio, or motor speed since input speed has been assumed to be constant, the driven clutch member rotates at the same speed as the drive clutch member of intermediate clutch 64. This predetermined transmission input-output speed ratio may occur at maximum motor output speed to obtain full benefit of the hydrostatic drive unit's speed ratio range and for illustrating the full transmission coverage and ease in understanding, bearing in mind the transmission input speed has been assumed to be constant, this condition of speed synchronization will be described as occuring at maximum motor output speed throughout the description of the operation.

An upshift from the forward low speed range drive to a forward intermediate speed range drive is preferably accomplished when the above speed-synchronized condition of intermediate clutch 64 is reached. The intermediate clutch 64 is then engaged while there is no need to disengage or release low brake 38. With intermediate clutch 64 engaged, mechanical drive is then transmitted from transmission input shaft 10 through one-way clutch 60 and gears 66 and 67 to carrier 58 of gear set 28 to drive this carrier in the forward direction. With carrier 58 thus mechanically driven in the forward direction, the speed component of the hydrostatically driven sun gear 34 subtracts from that of carrier 58 in the drive they cooperatively provide to drive ring gear 36 and connected transmission output shaft 12 in the forward direction and at a higher speed than that obtainable in the low speed range drive. Thus, the speed of ring gear 36 and connected transmission output shaft 12 increases with decreasing speed of the forwardly rotating sun gear 34 until the latter gear reaches zero speed. Then when sun gear 34 is driven in the opposite or reverse direction by motor 22, its reverse speed component adds to the forward speed component of carrier 58 so that the speed of ring gear 36 and connected transmission output shaft 12 increases with increasing speed of sun gear 34 in the reverse direction. Thus in the intermediate speed range drive which is provided by hydromechanical drive, the hydrostatic drive unit 14 is operated to decrease the speed of the forwardly rotating sun gear 34 from maximum forward motor output speed to zero and then to reverse the direction of this sun gear and increase its speed in the reverse direction to continuously increase the speed of transmission output shaft 12. Thus, maximum transmission output speed in this range occurs at maximum reverse motor output speed.

At the initiation of the intermediate speed range drive, the ring gear 52 in gearset 27 is at zero speed while the sun gear 29 is rotating forwardly at maximum motor speed and the carrier 31 is rotating forward at transmission output speed. Thus, the forward speed component of sun gear 29 fully offsets the forward speed component of carrier 31 so that they do not cooperatively drive ring gear 52 in either direction. In gearset 27, forward speed of sun gear 29 subtracts from this forward speed of carrier 31 in providing a forward drive to ring gear 52 and alternatively, reverse speed of sun gear 29 adds to the forward speed of carrier 31 in producing forward drive to ring gear 52. Thus when the motor output shaft 24 has its forward speed decreased to zero and then increased in speed in the reverse direction to increase the transmission output speed in the forward direction as described previously, the sun gear 29 which is driven by the motor output shaft 24 and the carrier 31 cooperate to drive the ring gear 52 in the forward direction at increasing speed. Ring gear 52 is permitted to rotate free in the forward direction by one-way brake 41 which thus permits the low brake 38 to remain engaged and thus operational on an upshift from low to the intermediate speed range drive.

Downshifting from the intermediate to the low speed range forward drive is also provided with a speed-synchronized condition at both one-way brake 41 and the reverse and low coast brake 54 by the drive to ring gear 52 provided by carrier 31 and sun gear 29 in the intermediate speed range drive. In the lower portion of the intermediate speed range drive, the sun gear 29 is rotating in the forward direction and thus its speed component subtracts from that of carrier 31 in the drive they cooperatively provide to produce forward rotation of ring gear 52. Thus, as the forward speed of sun gear 29 is increased to decrease transmission output speed, the forward speed of ring gear 52 is decreased and the drive through gears 48 and 49 decreases the speed of the inner race 42 of one-way brake 41 and the rotatable brake member of the reverse and low coast brake 54 with these members reaching zero speed at maximum forward motor output speed. Thus, at the maximum forward motor output speed in the intermediate speed range drive, the inner race 42 of one-way brake 41 is at zero speed and in addition, the rotatable member of the reverse and low coast brake is at zero speed. Thus the one-way brake 41 is speed synchronized for a downshift to the low speed range drive when brake 38 has remained engaged and alternatively, the reverse and low coast brake 54 is speed synchronized for a downshift to the low speed range drive when it is desired to downshift to low to obtain coast braking.

In the high end of the intermediate speed range forward drive when planetary gearset 28 is combining a hydrostatic power path and a mechanical power path to drive the output shaft 12, the sun gear 29 which is then rotating in the reverse direction and the carrier 31 which is rotating in the forward direction cooperate to drive the driven member of the high clutch 56 in the same direction as the drive member of this clutch which is being driven by the input shaft 10. The sizes of the operating gears are selected so that at maximum reverse motor output speed, the drive member and driven member of the high clutch 56 are rotating in the same direction at the same speed.

A shift from the intermediate-speed range drive to a forward high-speed range drive is preferably accomplished when the above speed-synchronized condition of high clutch 56 is reached. The high clutch 56 is then engaged while both the low brake 38 and intermediate clutch 64 may remain engaged. With high clutch 56 engaged, mechanical drive is then transmitted from transmission input shaft 10 through gears 48 and 49 to drive ring gear 52 in the forward direction. With sun gear 29 rotating in the reverse direction at the beginning of this drive, its speed component subtracts from that of ring gear 52 in the drive they cooperatively provide to carrier 31 and thus to transmission output shaft 12. Thus, in the high-speed range drive which is provided by hydromechanical drive, the hydrostatic drive unit 14 is operated to first decrease the speed of sun gear 29 in the reverse direction to zero speed and then increase its speed in the forward direction to maximum speed to continuously increase transmission output speed in the forward direction and in a speed range higher than that obtainable in the intermediate speed range drive.

In the high-speed range drive, the ring gear 36 of gearset 28 thus increases in speed in the forward direction while the reverse speed of sun gear 34 is reduced to zero and then increased in the forward direction. Since reverse speed of sun gear 34 subtracts from the forward speed of ring gear 36 in the drive these gears cooperatively provide to drive carrier 58 in the forward direction while forward speed of sun gear 34 adds to the forward speed component of ring gear 36 in their drive to carrier 58, the carrier 58 continuously increases in speed in the forward direction in the high-speed range drive with increasing output speed. With the intermediate clutch 64 remaining engaged in the high-speed range drive, the outer race 62 of one-way clutch 60 is thus driven in the high-speed range drive in the same direction as the input shaft 10 and at a faster speed. Thus the one-way clutch 60 permits the intermediate clutch 64 to remain engaged in the high-speed range drive. The one-way brake 41 permits free rotation of gear 48 in the direction of input shaft 10 and thus the low brake 38 may also remain engaged in the high speed range drive. Thus, both the low brake 38 and intermediate clutch 64 may remain engaged on the upshift to the high-speed range drive and thus remain operational for downshifting. Downshifting from the high to the intermediate-speed range drive is also provided with a speed-synchronized condition at the one-way clutch 60 by the drive to carrier 58 in the high-speed range drive. The drive from carrier 58 is transmitted by gears 67 and 66 and the engaged intermediate clutch 64 to the outer race 62 of one-way clutch 60. This speed synchronizes one-way clutch 60 at maximum reverse motor output speed in the high-speed range drive.

A reverse-speed range drive is provided by engaging only the reverse and low coast brake 54. With engagement of the reverse and low coast brake 54, rotation of ring gear 52 in either direction is prevented. Then on conditioning of the hydrostatic drive unit 14 to the drive sun gear 29 of gearset 27 in the reverse direction, the carrier 31 and connected transmission output shaft 12 are also driven in the reverse direction and at a reduced speed. Thus this drive is like that in the forward low speed range drive except that motor 22 is driven in the reverse direction.

Thus, the transmission according to the present invention permits simple control in that for forward drive operation, only one friction drive-establishing device is engaged for a drive and such a device that is engaged for a lower speed range drive may remain engaged on an upshift. Then when the transmission is downshifted, only the friction drive establishing device that is determining the higher speed range drive is released since the next lower speed range drive will automatically be established by its friction drive-establishing device that remained engaged and thus operational on the upshift. Furthermore, by having all of the friction drive-establishing devices concentrically arranged with each other in this short length transmission arrangement, the controls therefore may be closely associated therewith.

The above-described preferred embodiment is illustrative of the invention which may be modified within the scope of the appended claims.

I claim:

1. In a transmission the combination of an input shaft; an output shaft; variable-ratio hydrostatic drive means including a pump connected to be driven by said input shaft and further including a motor hydraulically connected to said pump; a pair of planetary gearsets each comprising a sun gear member, a ring gear member and a carrier member carrying a pinion meshing with the sun gear member and ring gear member; one member of each said gearset connected to be driven by said motor; another member of one of said gearsets and another member of the other of said gearsets connected to each other and also connected to drive said output shaft; first drive-establishing means for selectively preventing rotation of the third member of said one gearset in either a forward or reverse direction; second drive-establishing means including one-way brake means for selectively preventing said third member of said one gearset from rotating in said reverse direction while permitting free forward rotation thereof; third drive-establishing means including one-way clutch means for selectively connecting said input shaft to drive the third member of said other gearset in said forward direction; and fourth drive-establishing means for selectively connecting said input shaft to drive said third member of said one gearset whereby there is provided a low speed range forward drive on operation of only said second drive-establishing means; an intermediate-speed range forward drive on operation of only said third drive-establishing means while said second drive-establishing means remains operational, a high-speed range forward drive on operation of only said fourth drive-establishing means while both said second and third drive-establishing means remain operational and a low speed range forward and reverse drive on operation of only said first drive-establishing means.

2. The transmission set forth in claim 1 and said input shaft and said output shaft having parallel axes; said first, second and fourth drive-establishing means including a common gear train; said gear train comprising a first gear concentric with said output shaft and connected to said one gear member of said one gearset and a second gear concentric with said input shaft and in mesh with said first gear.

3. The transmission set forth in claim 2 and said third drive-establishing means including a gear train comprising a first gear concentric with said output shaft and connected to said third member of said other gearset and a second gear concentric with said input shaft and in mesh with the first gear.

4. The transmission set forth in claim 3 and said first drive-establishing means including brake means concentric with said input shaft; and said second drive-establishing means including brake means in series with said one-way brake means; both said brake means and said one-way brake means of said second drive-establishing means concentric with said input shaft; said third drive-establishing means including clutch means in series with said one-way clutch means; both said clutch means and said one-way clutch means concentric with said input shaft; said fourth drive-establishing means including clutch means concentric with said input shaft.

5. In a transmission the combination of an input shaft; an output shaft; variable-ratio hydrostatic drive means including a pump connected to be driven by said input shaft and further including a motor hydraulically connected to said pump; a pair of planetary gearsets each comprising a sun gear, a ring gear and a carrier carrying a pinion meshing with the sun gear and ring gear; both said sun gears connected to be driven by said motor; the carrier of one of said gearsets and the ring gear of the other of said gearsets connected to each other and also connected to said output shaft; means including a one-way brake for braking said ring gear of said one gearset against rotation in only one direction; means including a one-way clutch for connecting said input shaft to drive the carrier of said other gearset; and means for connecting said input shaft to drive said ring gear of said one gearset.

6. In a transmission the combination of an input shaft; an output shaft arranged parallel to said input shaft; variable-ratio hydrostatic drive means including a pump concentric with said input shaft and connected to be driven by said input shaft and further including a motor concentric with said output shaft and hydraulically connected to said pump; a pair of planetary gearsets each comprising a sun gear, a ring gear and a carrier carrying a pinion meshing with the sun gear and ring gear; both said sun gears connected to be driven by said motor; the carrier of one of the gearsets and the ring gear of the other of said gearsets connected to each other and also connected to said output shaft; a first gear train comprising a first gear concentric with said output shaft and connected to the ring gear of said one gearset and a second gear concentric with said input shaft and in mesh with said first gear; a first brake operable to brake said second gear of said first gear train to prevent rotation of the ring gear of said one gearset in either a forward or reverse direction; a second brake and a one-way brake in series therewith operable to brake said second gear of said first gear train against rotation in only one direction to prevent said ring gear of said one gearset from rotating in said reverse direction while permitting free forward rotation thereof; a first clutch operable to connect said input shaft to said second gear of said first gear train so that said ring gear of said one gearset is driven in said forward direction by said input shaft; a second gear train comprising a first gear concentric with said output shaft and connected to the carrier of said other gearset and a second gear concentric with said input shaft and in mesh with said first gear; and a second clutch and a one-way clutch in series therewith operable to connect said input shaft to the second gear of said second gear train so that the carrier of said other gearset is driven in said forward direction by said input shaft and is permitted to rotate freely in said forward direction when said first clutch is engaged.